July 6, 1937.　　A. CASHIER ET AL　　2,086,255
ADJUSTABLE PLATFORM FOR VEHICLES
Filed Jan. 7, 1937　　3 Sheets-Sheet 1
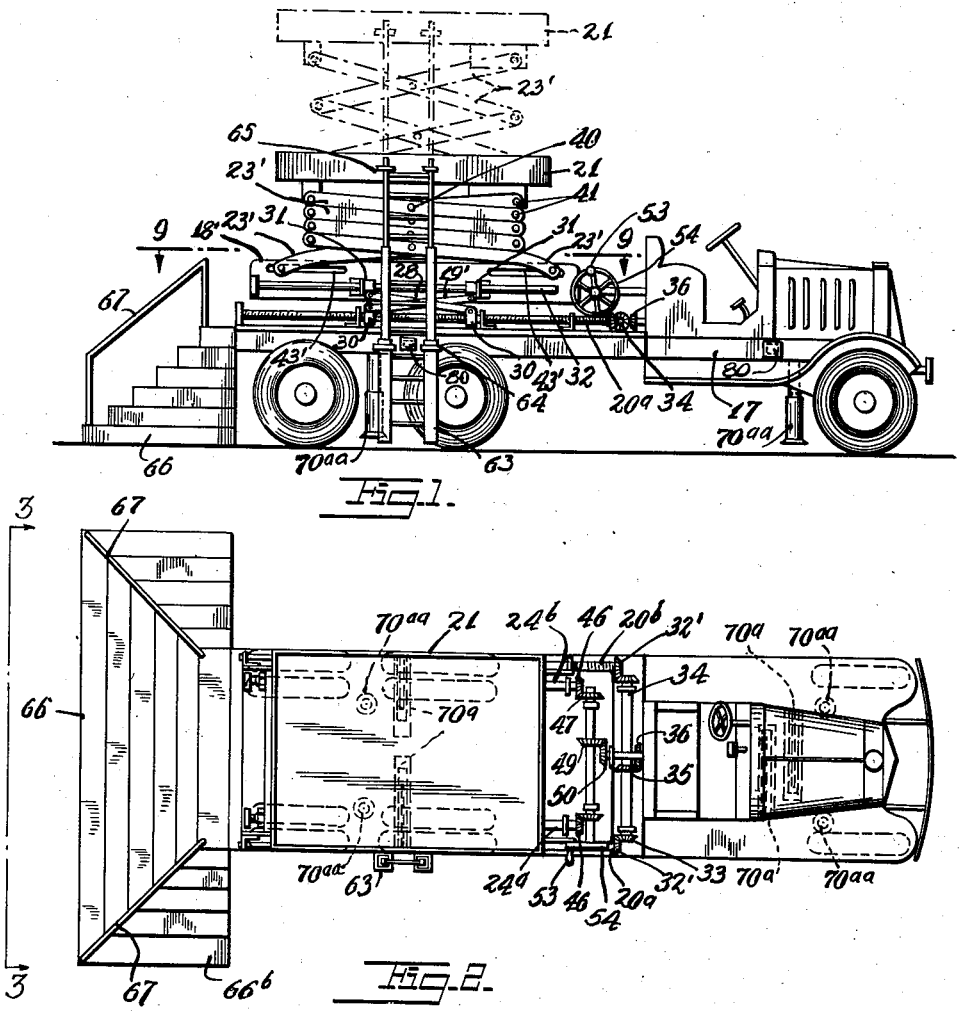
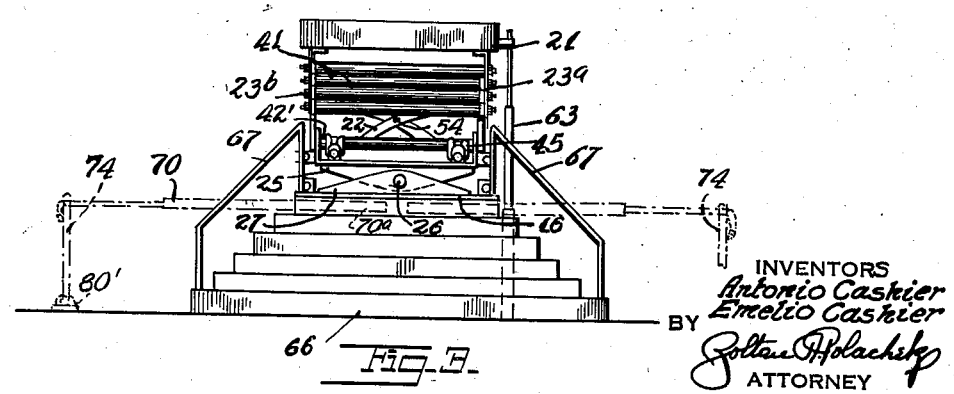
INVENTORS
Antonio Caskier
Emelio Caskier
BY
ATTORNEY

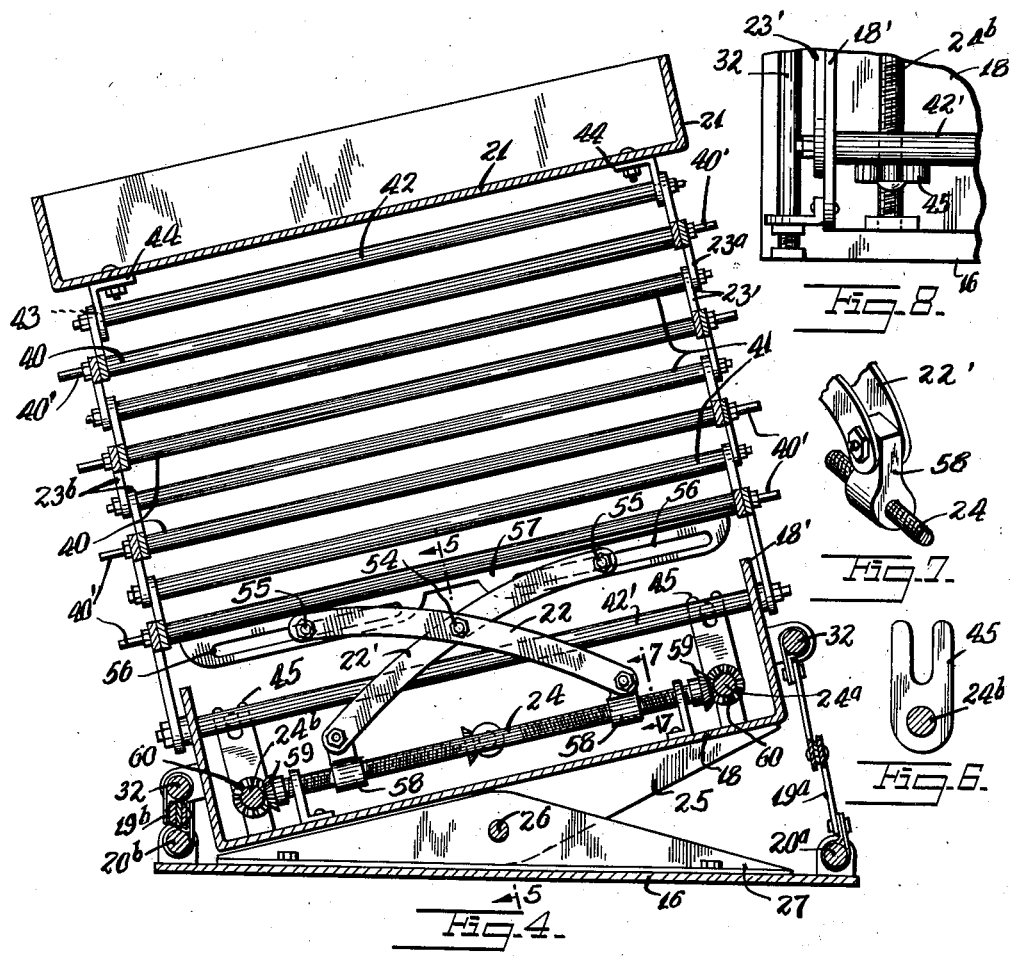
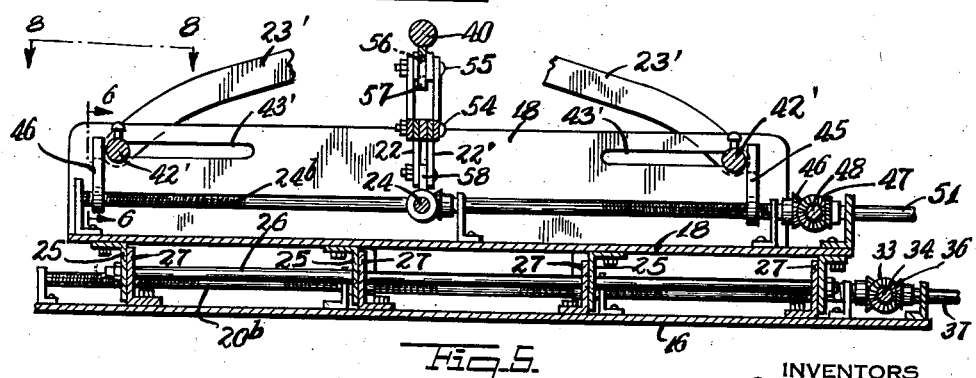

July 6, 1937.  A. CASHIER ET AL  2,086,255
ADJUSTABLE PLATFORM FOR VEHICLES
Filed Jan. 7, 1937  3 Sheets-Sheet 3
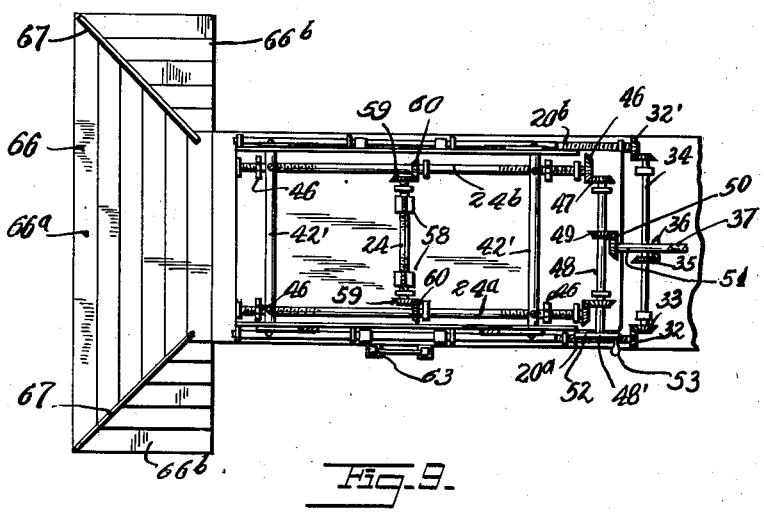
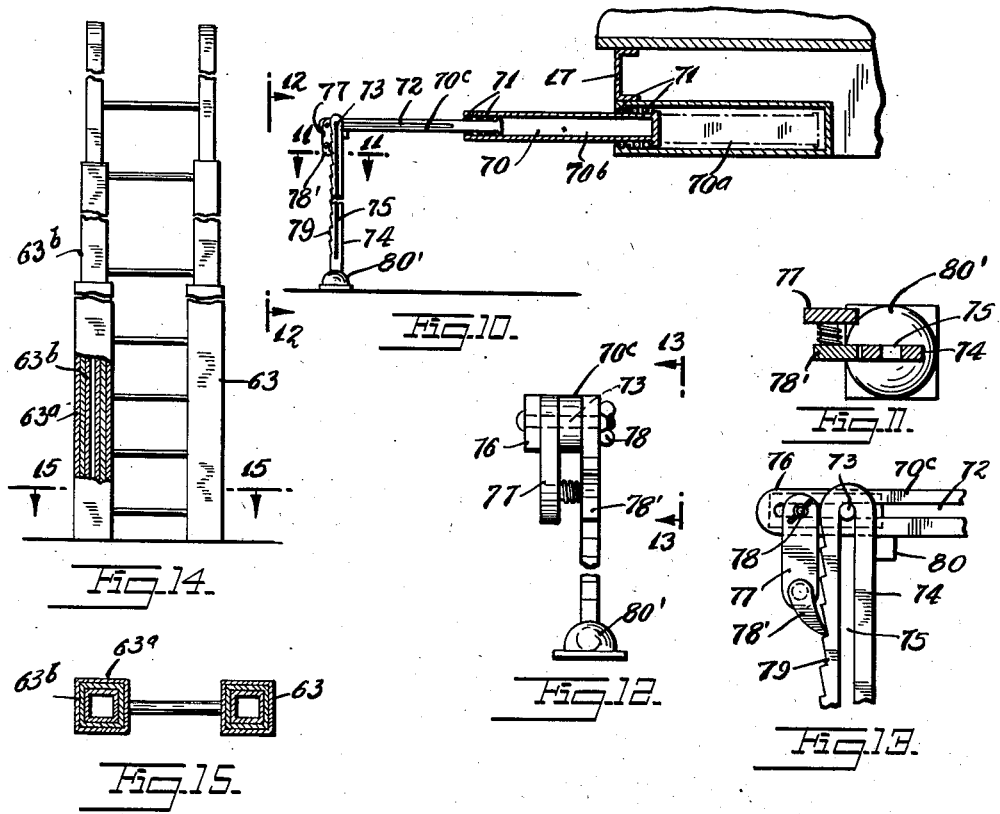
INVENTORS
Antonio Cashier
Emelio Cashier
BY
ATTORNEY Patented July 6, 1937

2,086,255

UNITED STATES PATENT OFFICE 2,086,255

ADJUSTABLE PLATFORM FOR VEHICLES

Antonio Cashier and Emelio Cashier, Syracuse, N. Y.

Application January 7, 1937, Serial No. 119,398

3 Claims. (Cl. 227—5)

This invention relates to new and useful improvements in an adjustable platform for vehicles.

The invention has for an object the construction of a fire apparatus as mentioned which is characterized by a base member such as a truck body upon which a plate is pivotally mounted upon a longitudinal line of the base member and which plate is arranged to support an extending device adapted to be raised to reach a window and lean over towards one side or the other so as to better reach the window when the truck is parked in the gutter or spaced from the wall of a house.

Furthermore, the invention proposes the provision of lazy tong structures on the longitudinal sides of the plate and connected with the base member and with a means for operating the lazy tong structures to pivot the plate towards one side or the other.

Another one of the objects of this invention is the provision of a platform superimposed on the plate and supported by a transverse lazy tong structure mounted between said plate and said platform, and furthermore supported by auxiliary lazy tong structures along the longitudinal sides of the platform and connecting with said plate by the operation of which the platform may be elevated when desired.

Still further the invention proposes the provision of projecting elements on the auxiliary tong structures which may be used as the rungs of a step ladder.

Another one of the objects of this invention resides in the provision of a flexible step ladder with telescopic sections so as to be extendable and mounted upon the side of the fire apparatus to extend when the platform is raised, and to retract when the platform is lowered.

Another one of the objects of this invention is the provision of a staircase or other platform construction which may be placed at one side or end of the truck body so that people lowered from a window on the platform may then walk down the stairs to the street.

Still further the invention also proposes the provision of support arms associated with the truck body which may be extended to one side and to the other side to help maintain the truck in an upright position and prevent its tipping over due to the fact that the platform and the weights on the platform will offset to one side relative to the base member and truck.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a vehicle constructed according to this invention.

Fig. 2 is a plan view of Fig. 1.

Fig. 3 is an end view of Fig. 2 looking in the direction of the line 3—3 of Fig. 2.

Fig. 4 is a transverse enlarged sectional view of the fire apparatus shown tilted to one side.

Fig. 5 is a fragmentary sectional view taken on the line 5—5 of Fig. 4.

Fig. 6 is a sectional view taken on the line 6—6 of Fig. 5.

Fig. 7 is a perspective view of a portion of Fig. 4 looking in the direction of the line 7—7 of Fig. 4.

Fig. 8 is a fragmentary elevational view looking in the direction of the line 8—8 of Fig. 5.

Fig. 9 is a horizontal sectional view taken on the line 9—9 of Fig. 1.

Fig. 10 is a fragmentary transverse sectional view of the support device shown in the extended operative position.

Fig. 11 is a horizontal sectional view taken on the line 11—11 of Fig. 10.

Fig. 12 is a fragmentary end elevational view looking in the direction of the line 12—12 of Fig. 10.

Fig. 13 is a fragmentary enlarged elevational view looking in the direction of the line 13—13 of Fig. 12.

Fig. 14 is an elevational view of the extension ladder used in conjunction with the fire apparatus.

Fig. 15 is a sectional view taken on the line 15—15 of Fig. 14.

The apparatus includes a base member 16 such as a portion of a truck body of a motor truck 17. A plate 18 is arranged upon the base member 16 along a longitudinal line thereof. Lazy tong structures 19$^a$ and 19$^b$ are arranged upon the longitudinal sides of the plate 18 and are connected with the base member 16. A means is provided for operating the lazy tong structures 19$^a$ and 19$^b$ which includes operating screws 20$^a$ and 20$^b$. A platform 21 is superimposed on the plate 18 and is supported by a transverse lazy tong structure 22 arranged between the plate 18 and indirectly connected with the platform 21. There are auxiliary lazy tong structures 23$^a$ and 23$^b$ arranged along the longitudinal side of the platform 21 and connected with the plate 18 and the platform 21. A means is provided for operating the said transverse lazy tong structure 22 which includes a transverse screw 24, and there is a means for operating the lazy tong structures 23$^a$ and 23$^b$ which includes screws 24$^a$ and 24$^b$.

The pivotal mounting of the plate 18 by several transverse angle members 25 mounted upon the bottom of the plate 18 and pivotally connected by a rod 20 with other transverse members 27 mounted upon the base member 16. These members 25 and 27 have their bottom and top edges respectively formed at an inclination so as to limit the pivoting of the plate 18. In Fig. 4 the plate 18 is shown pivoted towards the left with the left hand side portions of the members 25 and 27 forming a stop to limit further pivoting. It should be understood that the plate 18 may be pivoted towards the right to an equivalent position in which the right hand portions of the members 25 and 27 will form stops.

The lazy tong structures 19$^a$ and 19$^b$ are substantially identical in construction. Each comprises a pair of crossed arms 19' pivotally connected at or near their centers by a pintle 28. The lower ends of each of these arms are pivotally connected with members 30 which threadedly engage upon sections of the operating screws 20$^a$. These sections have their threads on opposite hand so that when the screws are rotated the members 30 either move together or move apart. The other ends of the arms 19 are pivotally connected with members 31 which engage upon rods 32 fixedly mounted on side portions 18' of the plate 18. One of the members 31 is fixedly secured to the rod 32, while the other is slidable on the rod. This is conventional lazy tong construction which will cause the plate 18 to be moved relative to the base member 16 when the screw 20$^a$ is turned.

The screws 20$^a$ and 20$^b$ are connected up for unitary operation by reason of each of these screws being provided with a bevel gear 32'. These bevel gears mesh with bevel gears 33 upon a transverse shaft 34 having a central bevel gear 35 meshing with a bevel gear 36 on a single operator shaft 37. This permits the shaft 37 to be rotated in one direction or the other to simultaneously operate the screws 20$^a$ and 20$^b$. These screws are of such hands that when the lazy tong structure 19$^a$ expands the lazy tong structure 19$^b$ contracts, and vice versa. Thus the plate 18 may be pivoted in one or the other direction.

The lazy tong structures 23$^a$ and 23$^b$ are of substantially identical design. Each consists of a plurality of arms 23' pivotally connected intermediate of their ends with adjacent arms by the pintle members 40. The outer ends of the adjacent arms are pivotally connected with each other by the pintles 41. The uppermost arms are connected with transverse rods 42 which extend transversely between the upper ends of the lazy tong structures 23$^a$ and 23$^b$. These rods 42 pass through elongated slots 43 formed in angle members 44 secured to the bottom wall of the platform 21. The arrangement permits the lazy tongs 23$^a$ and 23$^b$ to operate. The lower ends of the lower arms 23' are also provided with transverse rods 42' connected between the lazy tong structures 23$^a$ and 23$^b$. These rods 42' engage through elongated slots 43' formed in the side wall portions 18' of the plate 18. The arms 23' of the lazy tong structures may all be of the same size or diminish in length toward the upper portion of these structures.

Thus the lower ends of the lazy tong structures 23$^a$ and 23$^b$ may move closer together or further apart as conditions require. The screws 24$^a$ and 24$^b$ indirectly control the operation of the lazy tong structures 23$^a$ and 23$^b$. These screws are provided with followers 45 threadedly mounted thereon and engaging against the rods 42'. These followers engage against the outer sides of the rods. When the screws 24$^a$ and 24$^b$ rotate the followers 45 move the rods 42' closer together and so extend the lazy tong structures 23$^a$ and 23$^b$. When the screws 24$^a$ and 24$^b$ are rotated in the reverse the lazy tong structures are retracted. The screws 24$^a$ and 24$^b$ are connected for unitary operation by reason of bevel gears 46 mounted on the ends of the screws and meshing with bevel gears 47 on a transverse shaft 48 which is provided with a central bevel gear 49 meshing with a bevel gear 50 of a single operator shaft 51. Thus this operator shaft 51 may be rotated to operate the screws 24$^a$ and 24$^b$ simultaneously.

The shaft 48 also has an extended end 48' upon which there is a wheel 52 having a handle 53 by which the screws may be manually operated when desired. The wheel 52 may be turned in one direction to extend the lazy tongs, and in the other direction to retract them. The shafts 37 and 51 may be coupled to the motor of the vehicle 17 (the details of this coupling not being shown on the drawings) if it is desired to operate the fire apparatus mechanically.

The lazy tong structure 22 is for the purpose of holding the lazy tongs 23$^a$ and 23$^b$ in a central position upon the base plate 18. This is necessary since the rods 42' are both free and work in the slots 43'. The lazy tong 22 comprises a pair of crossed arms 22' pivotally connected at their centers by a pintle 54. The upper ends of the arms 22' are provided with pintles 55 working in slots 56 in a member 57 secured to the lowermost of the pintle rods 40. The lower ends of the arms 22' are pivotally connected with followers 58 which are threadedly engaged on sections of the screw 24. This screw is rotatively supported upon the plate 18 and at its ends is provided with bevel gears 59 meshing with bevel gears 16 fixed on the screws 24$^a$ and 24$^b$. Thus when the lazy tongs 23$^a$ and 23$^b$ are operated the lazy tongs 22 will be simultaneously operated. These lazy tongs are synchronized with each other so that they do not interfere with each other's operation. The bottom-most pintle rod 40 moves up in relation to the motion of the lazy tongs 23$^a$ and 23$^b$ and also in relation to the operation of the lazy tongs 22. Each of the pintle rods 40 have projecting ends 40' which may be used as the rungs of a ladder.

A flexible and extendible ladder 63 is associated with one side of the fire apparatus. This ladder comprises several sections 63$^a$, 63$^b$, etc., telescopically engaged with each other. The lowermost section 63$^a$ is fixedly mounted by clamps 64 to the body of the truck 17. The uppermost section of the telescopic ladder is attached by clamps 65 to the platform 21. The arrangement provides a ladder extended from the ground up to the platform 21 in all extended positions of the platform. The details of the ladder form no part of this invention and for this reason will be omitted from the specification, particularly in view of the fact that extension ladders are notoriously old.

A staircase construction 66 is associated with the rear end of the truck 17. This staircase construction comprises steps 66$^a$ at the back and steps 66$^b$ at the sides. Between these steps there are railings 67 which persons may hold on to when coming down or up these steps. This stair construction 66 is freely rested on the ground and may normally be carried upon the platform 21 when the fire apparatus is not being used.

In order to avoid a top heavy structure which would be present when the platform 21 is extended to its fullest height and the plate 18 is pivoted towards one side, there are extendible support arms 70 associated with each side of the truck body 17 at the front and at the back, four in all, and each adapted to be extended as required. Furthermore there are four jacks 70$^{aa}$, one near each support arm 70. When the platform 21 is tilted towards one side the support arms and jacks on that side are extended and vice versa. Each of these support arms 70 comprise several telescopic sections 70$^a$, 70$^b$ and 70$^c$. The outer telescopic section 70$^a$ is attached to the truck body 17 located beneath the body. The sections 70$^b$ and 70$^c$ telescopically engage in the section 70$^a$ and may be extended when required. Bearings 71 are associated with the movable sections to act as anti-friction devices, so that the sections may be easily extended. They will maintain extended or retracted positions frictionally.

The outer section 70$^c$ is provided with an elongated slot 72 through which a bolt 73 slidably engages. This bolt supports a leg 74 which is also formed with an elongated slot 75. The bolt 73 also supports a block 76 arranged on the opposite side of the section 70$^a$ to that of the leg 74. A finger 77 is supported by a bolt 78 from the block 76. This finger 77 supports a spring urged pawl 78 which engages ratchet teeth 79 formed upon one side of the arm 74. A block 80 is secured to the section 70$^c$ and abuts against one side of the leg 74 to limit pivoting of the leg in one direction and to hold the leg substantially in a vertical position. The leg is provided with a foot 80' which may rest on the ground.

The leg 74 may assume various vertical positions by disengaging the pawl 78 and moving it upwards as permitted by the slot 75. Thus if the leg 74 is required to rest upon a sidewalk or other elevation it is capable of being placed in the proper position. The extended support arms will stabilize the fire apparatus so that it does not tilt towards the top-heavy direction.

The operation of the device is as follows:—

The shaft 37 may be rotated to indirectly rotate the screws 20$^a$ and 20$^b$ to cause the lazy tong structures 19$^a$ and 19$^b$ to operate simultaneously and pivot the plate 18 towards one side or the other. The lazy tongs 19$^a$ and 19$^b$ operate in opposite directions, that is, when one opens the other closes.

The shaft 51 or the wheel 52 may be turned to cause the simultaneous operation of the screws 24$^a$ and 24$^b$ which indirectly cause the extension or retraction of the transverse lazy tong structure 22 and the auxiliary lazy tong structures 23$^a$ and 23$^b$. This causes the extension or retraction of the platform 21. The support arms 70 may be extended to compensate for an off center top heavy construction due to the extension of the platform 21 being inclined towards one side, and the jacks 70$^{aa}$ may be used for the same purpose.

It is to be understood that this adjustable platform may be used also for other purposes, such as painting the walls of buildings, for washing windows, etc.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:—

1. A fire apparatus comprising a base member such as a truck body, a plate upon said base member and pivotally mounted upon a longitudinal line on said base member, lazy tong structures on the longitudinal sides of said plate and cooperatively connected with said base member, means for operating said lazy tong structures for pivoting said plate towards one side or the other, a platform superimposed on said plate and supported by a transverse lazy tong structure indirectly mounted between said plate and said platform and furthermore supported by auxiliary lazy tong structures along the longitudinal sides of said platform and directly connected with said plate and said platform, and means for operating said transverse and auxiliary lazy tong structures for raising or lowering said platform, the pivotal mounting of said plate comprising several transverse members secured upon said plate and on said base member, and a pivotal rod through said transverse members.

2. A fire apparatus comprising a base member such as a truck body, a plate upon said base member and pivotally mounted upon a longitudinal line on said base member, lazy tong structures on the longitudinal sides of said plate and cooperatively connected with said base member, means for operating said lazy tong structures for pivoting said plate towards one side or the other, a platform superimposed on said plate and supported by a transverse lazy tong structure indirectly mounted between said plate and said platform and furthermore supported by auxiliary lazy tong structures along the longitudinal sides of said platform and directly connected with said plate and said platform, and means for operating said transverse and auxiliary lazy tong structures for raising or lowering said platform, the pivotal mounting of said plate comprising several transverse members secured upon said plate and on said base member, and a pivotal rod through said transverse members, said transverse members being provided with inclined sides to limit the pivoting of said plate.

3. A fire apparatus comprising a base member such as a truck body, a plate upon said base member and pivotally mounted upon a longitudinal line on said base member, lazy tong structures on the longitudinal sides of said plate and cooperatively connected with said base member, means for operating said lazy tong structures for pivoting said plate towards one side or the other, a platform superimposed on said plate and supported by a transverse lazy tong structure indirectly mounted between said plate and said platform and furthermore supported by auxiliary lazy tong structures along the longitudinal sides of said platform and directly connected with said plate and said platform, and means for operating said transverse and auxiliary lazy tong structures for raising or lowering said platform, said transverse lazy tong structure being connected with a transverse pintle element of said auxiliary lazy tong structures.

ANTONIO CASHIER.
EMELIO CASHIER.